(12) United States Patent
Matsudaira

(10) Patent No.: US 11,977,058 B2
(45) Date of Patent: May 7, 2024

(54) CHROMATOGRAPHY SYSTEM

(71) Applicant: SHIMADZU CORPORATION, Kyoto (JP)

(72) Inventor: Atsushi Matsudaira, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 360 days.

(21) Appl. No.: 16/958,693

(22) PCT Filed: Feb. 2, 2018

(86) PCT No.: PCT/JP2018/003538
§ 371 (c)(1),
(2) Date: Jun. 27, 2020

(87) PCT Pub. No.: WO2019/150544
PCT Pub. Date: Aug. 8, 2019

(65) Prior Publication Data
US 2020/0348272 A1 Nov. 5, 2020

(51) Int. Cl.
*G01N 30/02* (2006.01)
*G01N 30/06* (2006.01)
(Continued)

(52) U.S. Cl.
CPC .............. *G01N 30/60* (2013.01); *G01N 30/02* (2013.01); *G01N 30/06* (2013.01); *G01N 30/16* (2013.01);
(Continued)

(58) Field of Classification Search
CPC ......... G01N 30/02; G01N 30/16; G01N 30/88
See application file for complete search history.

(56) References Cited

U.S. PATENT DOCUMENTS 5,892,458 A    4/1999  Anderer

FOREIGN PATENT DOCUMENTS

EP      0366854 A2 *  5/1990
JP   1989054350 A      3/1989
(Continued)

OTHER PUBLICATIONS

Office Action for corresponding CN Application No. 201880079937.9 dated Jul. 13, 2022, with English language translation.
(Continued)

*Primary Examiner* — Jamel E Williams
*Assistant Examiner* — Alex T Devito
(74) *Attorney, Agent, or Firm* — Renner, Otto, Boisselle & Sklar, LLP

(57) ABSTRACT

Provided is a chromatography system including a usage information storage device, a column usage information holding part, and a usage information managing part. The usage information storage device is provided corresponding to the analytical column incorporated in the chromatography system and is configured to keep usage information for each corresponding analytical column. The column usage information holding part is provided separately from the analytical column and is configured to keep usage information for each of the analytical columns which may be incorporated in the chromatography system. The usage information managing part is configured to update, at a timing when an analysis process of separating a sample injected into the analysis channel using the analytical column is executed, the usage information kept by the usage information storage device and the usage information kept by the column usage information holding part in association with the analytical column to latest usage information.

5 Claims, 3 Drawing Sheets

(51) Int. Cl.
  *G01N 30/16* (2006.01)
  *G01N 30/60* (2006.01)
  *G01N 30/86* (2006.01)
(52) U.S. Cl.
  CPC ....... *G01N 30/86* (2013.01); *G01N 2030/027* (2013.01)

(56) References Cited

FOREIGN PATENT DOCUMENTS

| | | | |
|---|---|---|---|
| JP | 9-171022 A | | 6/1997 |
| JP | H10143383 A | * | 5/1998 |
| JP | H11122276 A | * | 4/1999 |
| JP | 2008-209327 A | | 9/2008 |

OTHER PUBLICATIONS

Office Action for corresponding JP Application No. 2019-568513 dated Jun. 8, 2021, with English language translation.
International Search Report for corresponding Application No. PCT/JP2018/003538, mailed May 1, 2018.
Partial Translation of Written Opinion for corresponding Application No. PCT/JP2018/003538, mailed May 1, 2018.
Office Action for corresponding CN Application No. 201880079937.9 dated Mar. 3, 2023, with English language translation.

\* cited by examiner

CHROMATOGRAPHY SYSTEM

TECHNICAL FIELD

The present invention relates to a chromatography system that guides a sample injected into an analysis channel to an analytical column and detects a sample component separated in the analytical column.

BACKGROUND ART

In chromatographic analysis, separability in an analytical column greatly affects an analytical result. The analytical column is filled with a separation device that deteriorates and decreases in separability with increase in cumulative usage time, therefore, usage of the analytical column needs to be appropriately managed. In addition, one analytical column may be reused in multiple chromatography systems.

Thus, to manage information related to the analytical column, attaching a storage device to each analytical column appropriately and easily, the storage device (hereinafter, referred to as a usage information storage device) being a flash memory or the like that keeps usage information such as the last usage date and time of the analytical column, and cumulative usage time, together with identification information for the analytical column, has been proposed and practiced (e.g., refer to Patent Document 1).

PRIOR ART DOCUMENT

Patent Document

Patent Document 1: Japanese Patent Laid-open Publication No. 2008-209327

SUMMARY OF THE INVENTION

Problems to be Solved by the Invention

As the usage information storage device attached to the analytical column is hardware, it may be damaged. In particular, when the analytical column is incorporated into chromatography, the usage information storage device is also housed in a column oven together with the analytical column and placed under high temperature conditions. This causes the usage information storage device to be easily damaged by heat. When the usage information storage device attached to the analytical column is damaged, usage of the analytical column until that time cannot be grasped. Thus, the analytical column cannot be appropriately managed.

Thus, it is an object of the present invention to enable appropriate management of usage information for an analytical column even when a usage information storage device provided corresponding to the analytical column is damaged.

Solutions to the Problems

A chromatography system according to the present invention is configured so that an analytical column is incorporated in an analysis channel through which a mobile phase flows, and a sample injected into the analysis channel is separated in the analytical column. The chromatography system includes a usage information storage device, a column usage information holding part, and a usage information managing part. The usage information storage device is provided corresponding to the analytical column incorporated in the chromatography system and is configured to keep usage information for each corresponding analytical column. The column usage information holding part is provided separately from the analytical column and is configured to keep usage information for each analytical column which may be incorporated in the chromatography system. The usage information managing part is configured to update, at a timing when an analysis process of separating a sample injected into the analysis channel using the analytical column is executed, the usage information kept by the usage information storage device and the usage information kept by the column usage information holding part in association with the analytical column to latest usage information.

That is, in the chromatography system according to the present invention, the latest usage information for the analytical column incorporated in the chromatography system is kept in the usage information storage device provided corresponding to the analytical column and in the column usage information holding part provided separately from the analytical column. This enables usage information for the analytical column to be obtained from the column usage information holding part provided separately from the analytical column even when the usage information storage device provided corresponding to the analytical column is damaged, so that usage of the analytical column can be managed appropriately.

The usage information managing part is preferably configured to create, at the timing when the analysis process of separating a sample injected into the analysis channel using the analytical column is executed, the latest usage information using the usage information already kept by the usage information storage device and usage information resulted from a result of the analysis process, and to cause the usage information storage device and the column usage information holding part to keep the latest usage information.

The chromatography system according to the present invention preferably includes a usage information restoring part configured to cause the usage information storage device provided corresponding to the analytical column incorporated in the chromatography system to keep the latest usage information for the analytical column, using the usage information for the analytical column kept in the column usage information holding part. This enables restoring the usage information storage device storing the latest usage information for the analytical column, to which the usage information storage device is to be attached, when the usage information storage device attached the analytical column is replaced with a new one due to damage to the usage information storage device, by storing the usage information for the analytical column kept in the column usage information holding part in the new usage information storage device.

The usage information restoring part may be configured to cause the usage information storage device to keep usage information for the analytical column selected from among the analytical columns for which usage information is kept in the column usage information holding part based on a user operation during restoring operation of the usage information.

The usage information restoring part may also be configured to cause, if the usage information storage device provided corresponding to the analytical column incorporated in the chromatography system keeps no usage information for the analytical column, the usage information storage device to keep the usage information for the analytical column kept in the column usage information holding part.

If the usage information storage device provided corresponding to the analytical column is damaged, information cannot be read out from the usage information storage device. Thus, the chromatography system according to the present invention preferably includes a damage notifying part configured to execute a damage notification operation of notifying a user that usage information is unable to be read out if the usage information is unable to be read out from the usage information storage device provided corresponding to the analytical column incorporated in the chromatography system. This enables the user to recognize easily that the usage information storage device is damaged, so that analysis is prevented from being started with the usage information storage device in which the usage information cannot be updated.

Effects of the Invention

In the chromatography system according to the present invention, the latest usage information for the analytical column incorporated in the chromatography system is kept in both the usage information storage device provided corresponding to the analytical column, and the column usage information holding part provided separately from the analytical column. Thus, even when the usage information storage device provided corresponding to the analytical column is damaged, the usage information for the analytical column is not lost, and usage of the analytical column can be properly managed.

EMBODIMENT OF THE INVENTION

Figure 1:
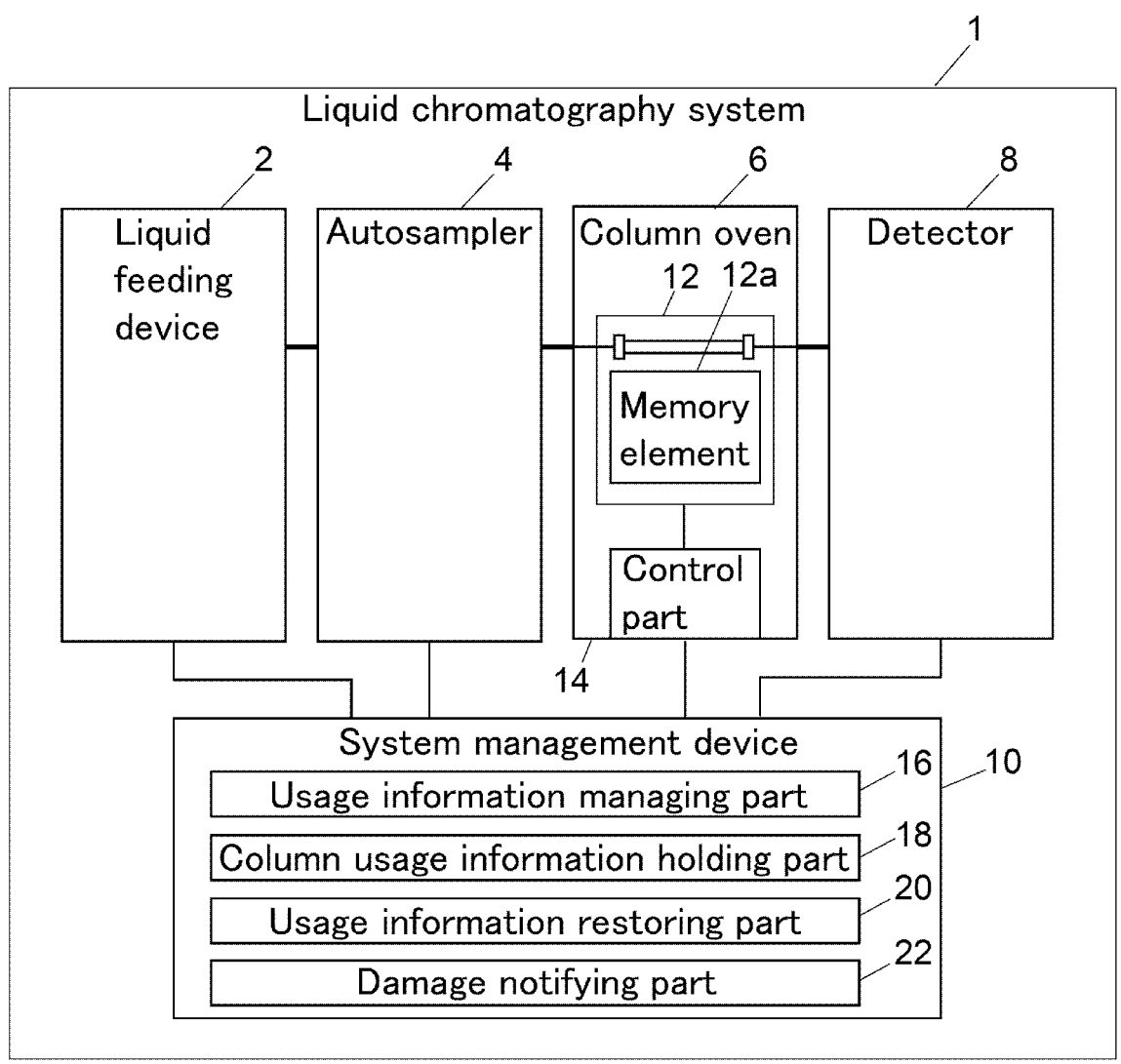
FIG. 1 is a block diagram schematically illustrating a chromatography system according to an embodiment.

Hereinafter, a chromatography system according to an embodiment of the present invention will be described with reference to the drawings. Although a liquid chromatography system will be described below as an example of the chromatography system, the present invention can also be similarly applied to a supercritical fluid chromatography system and a gas chromatography system.

A liquid chromatography system 1 includes a liquid feeding device 2, an autosampler 4, a column oven 6, a detector 8, and a system management device 10. The liquid feeding device 2, the autosampler 4, the column oven 6, and the detector 8 are connected in series with pipes to constitute an analysis channel for performing liquid chromatography analysis.

The liquid feeding device 2 is configured to feed a mobile phase in the analysis channel. The autosampler 4 is configured to inject a sample into the analysis channel in which the mobile phase from the liquid feeding device 2 flows. The column oven 6 is configured to adjust temperature of an analytical column housed therein to a predetermined temperature. The analytical column 12 housed in the column oven 6 is connected to a downstream side of the autosampler 4. The detector 8 is connected to a downstream side of the analytical column 12 housed in the column oven 6 and is configured to detect sample components separated in the analytical column 12.

A memory element 12a is provided corresponding to the analytical column 12. Examples of providing the memory element 12a corresponding to the analytical column 12 include the memory element 12a is built in the analytical column 12, the memory element 12a is attached to the outside of the analytical column 12, and the memory element 12a is provided completely separated from the analytical column 12. The memory element 12a is configured to keep usage information such as cumulative usage time of the analytical column 12, a cumulative frequency of usage thereof, and a last usage date and time, together with identification information for the analytical column 12, and serves as a usage information storage device for holding usage information for the analytical column 12. The memory element 12a provided corresponding to the analytical column 12 is connected to a control part 14 mounted in the column oven 6, being electrically communicable with each other when the analytical column 12 is housed in the column oven 6 and incorporated in the chromatography system 1. The control part is, for example, an electronic circuit board having a function of controlling operation of a heater or a fan provided for adjusting temperature inside the column oven 6.

The system management device 10 is configured to perform electrical communication with each of the liquid feeding device 2, the autosampler 4, the column oven 6, and the detector 8 to perform overall operation management of the liquid chromatography system 1. The system management device 10 is implemented by, for example, a dedicated computer or a general-purpose personal computer.

The system management device 10 has a function of communicating information to the memory element 12a of the analytical column 12 incorporated in the liquid chromatography system 1 using the control part 14 to manage usage of the analytical column 12. As functions of managing the analytical column 12, the system management device 10 includes a usage information managing part 16, a column usage information holding part 18, a usage information restoring part 20, and a damage notifying part 22. The usage information managing part 16, the usage information restoring part 20, and the damage notifying part 22 each have a function obtained by allowing an arithmetic element such as a microcomputer to execute a predetermined program. The column usage information holding part 18 has a function implemented by a partial storage area of a storage device provided in the system management device 10.

The usage information managing part 16 is configured to perform update operation of usage information in the memory element 12a and the column usage information holding part 18 so that the latest usage information for the analytical column 12 is kept in both the memory element 12a and the column usage information holding part 18. Specifically, the usage information managing part 16 reads out the usage information for the analytical column 12 from the memory element 12a of the analytical column 12 before the liquid chromatography analysis is started, and updates the usage information after the analysis is completed, based on the usage information before the liquid chromatography analysis is started. Then, the latest usage information updated using the control part 14 is written into the memory element 12a, and the same latest usage information is also written into the column usage information holding part 18.

As described above, one analytical column 12 may be reused in a plurality of liquid chromatography systems 1. Even in such a case, the same update operation is performed in each liquid chromatography system 1, so that the latest usage information is always kept in the memory element 12a. Thus, when the analytical column 12 used in another liquid chromatography system 1 is incorporated in the liquid chromatography system 1, the usage information for the analytical column 12 is further updated based on the latest usage information kept in the memory element 12a provided corresponding to the analytical column 12 incorporated in the liquid chromatography system 1. The updated latest usage information is kept in the memory element 12a and the column usage information holding part 18. Thus, even when the same analytical column 12 is reused in a plurality of liquid chromatography systems 1, the column usage information holding part 18 of one of the liquid chromatography systems 1 keeps the latest usage information for the analytical column 12. This prevents the latest usage information from being lost even when the memory element 12a is damaged.

In addition, a plurality of types of analytical columns 12 may be selectively used in one liquid chromatography system 1 depending on a sample to be analyzed. For this case, the column usage information holding part 18 is configured to keep usage information for each analytical column 12 in association with identification information for each corresponding analytical column 12 (or identification information for the memory element 12a provided corresponding to each analytical column 12), so that the latest usage information for each analytical column 12 is kept in both the memory element 12a provided corresponding to each analytical column 12 and the column usage information holding part 18.

The usage information restoring part 20 is configured to execute restoring operation of writing usage information kept in the column usage information holding part 18 into the memory element 12a to restore the usage information to the memory element 12a. When the memory element 12a provided corresponding to the analytical column 12 is damaged, the memory element 12a is replaced with a new one. Thus, the usage information of the analytical column 12 is not kept in the memory element 12a. In such a case, using a function of restoring usage information of the usage information restoring part 20 enables holding the latest usage information for the analytical column 12 in the new memory element 12a.

The system management device 10 has a damage notifying function of detecting damage to the memory element 12a provided corresponding to the analytical column 12 to notify a user of the damage. The damage notifying function is implemented by the damage notifying part 22. The damage to the memory element 12a can be detected by determining whether information can be read out from the memory element 12a. The damage notifying part 22 is configured so that when the system management device 10 cannot normally perform communication (reading out information from the memory element 12a) with the memory element 12a, the user is notified of this fact. The notification may be performed, for example, by a method of displaying a warning on a display connected to the system management device 10 or by a method of emitting a warning sound.

Figure 2:
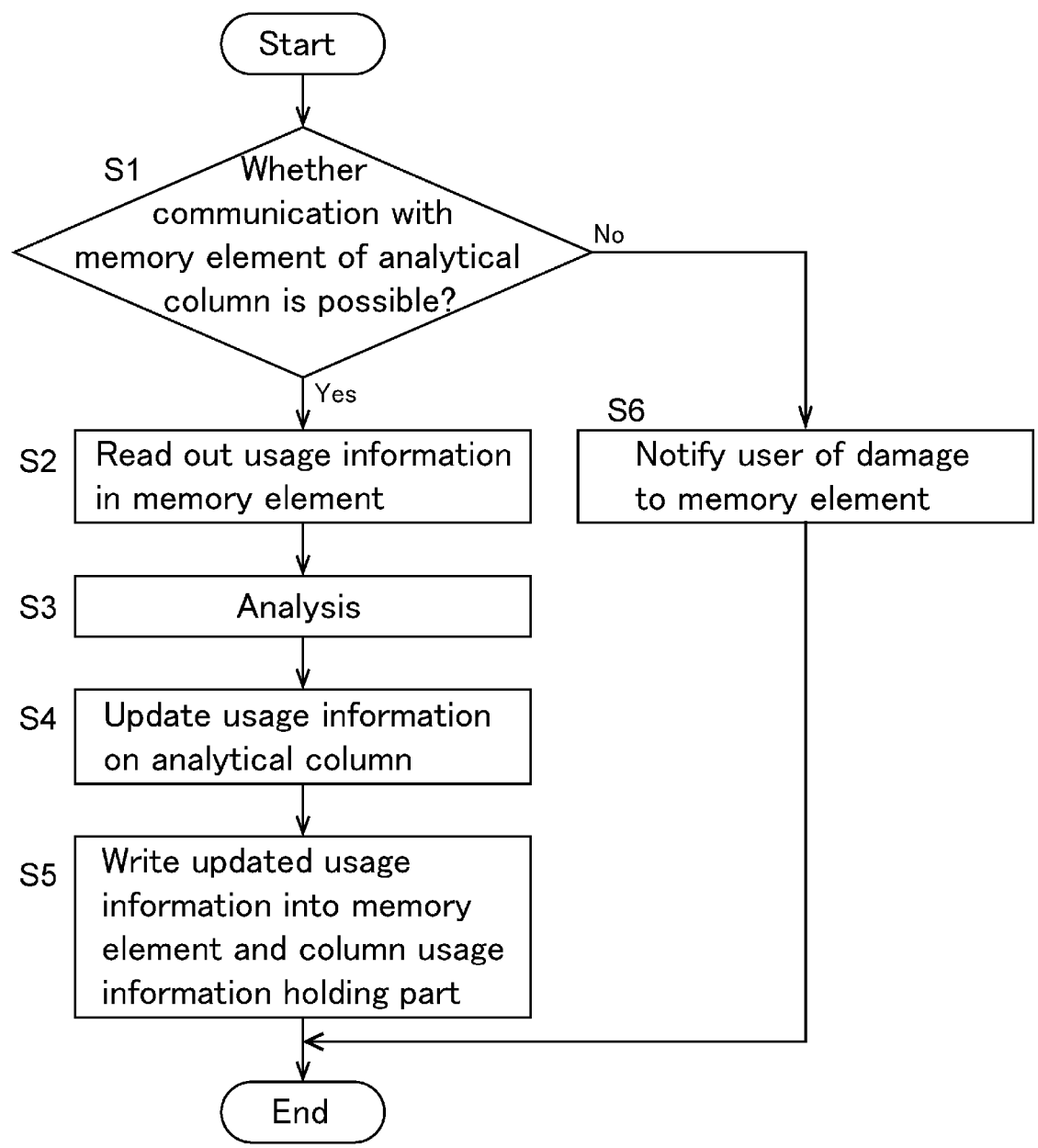
FIG. 2 is a flowchart for illustrating an example of operation of updating usage information and operation of notifying damage to an analytical column according to the embodiment.

The above operation of managing usage information and operation of notifying damage will be described with reference to the flowchart of FIG. 2 together with FIG. 1.

When the liquid chromatography system 1 that is incorporated with the analytical column 12 is activated, the system management device 10 attempts communication with the memory element 12a provided corresponding to the analytical column 12 (step S1). When the communication can be performed between the system management device 10 and the memory element 12a, the usage information managing part 16 reads out usage information from the memory element 12a (step S2). When the communication cannot be performed between the system management device 10 and the memory element 12a, the damage notifying part 22 notifies a user that the memory element 12a is damaged (step S6).

When the usage information managing part 16 can normally read out the usage information from the memory element 12a (step S2), liquid chromatography analysis is executed (step S3), and duration of the analysis and an end date and time thereof are recorded. The usage information managing part 16 updates the usage information read out from the memory element 12a using the recorded duration of the analysis and end date and time thereof (step S4). Specifically, for example, the duration of the analysis is added to cumulative usage time read out as one of the usage information from the memory element 12a to update the last usage date and time. The usage information managing part 16 writes the usage information for the analytical column 12 updated using the control part 14 into the memory element 12a, and further writes the same usage information into the column usage information holding part 18 while associating it with identification information for the analytical column 12 or identification information for the memory element 12a (step S5).

Figure 3:
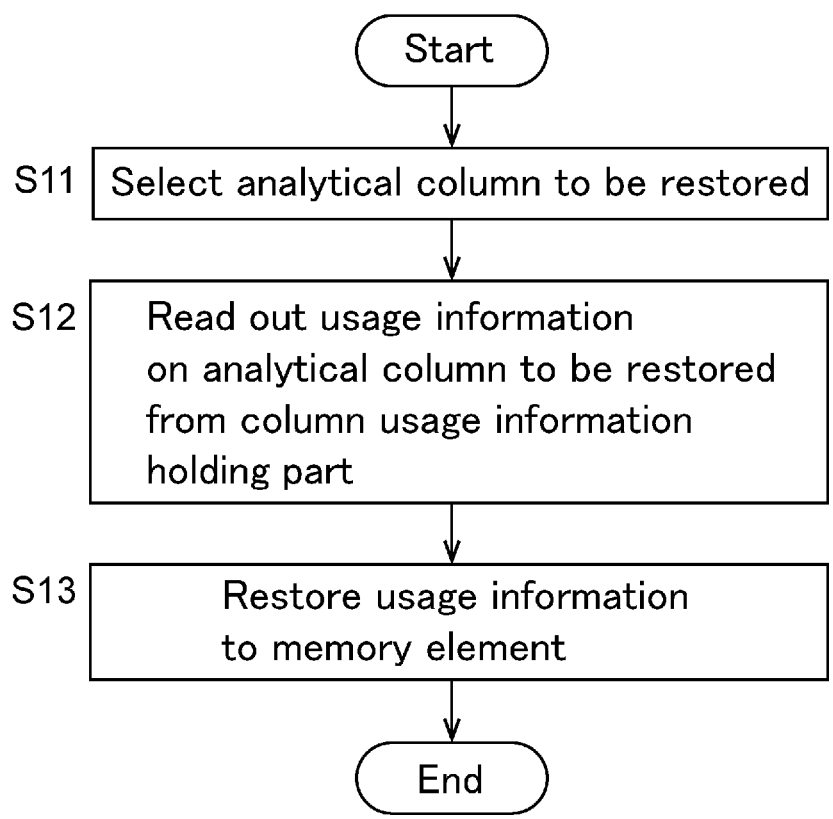
FIG. 3 is a flowchart for illustrating an example of restoring operation of usage information according to the embodiment.

Next, the restoring operation of usage information to the memory element 12a will be described with reference to the flowchart of FIG. 3 together with FIG. 1.

The usage information restoring part 20 is configured to execute this restoring operation, for example, in response to a request from a user. The usage information restoring part 20 may be configured to automatically execute the restoring operation when recognizing that the latest usage information for the analytical column 12 is not kept in the memory element 12a.

When the restoring operation is executed, the usage information restoring part 20 displays a list of each analytical column 12 with usage information kept in the column usage information holding part 18 on a display connected to the system management device 10 to allow a user to select the analytical column 12 to be restored (step S11). The user may input identification information for the analytical column 12 to select the analytical column 12 to be restored.

When the user selects the analytical column 12 to be restored, the usage information restoring part 20 reads out the usage information for the analytical column 12 to be restored from the column usage information holding part 18 (step S12), and then writes the usage information into the memory element 12a (step S13). At this time, when the usage information for the analytical column 12 is kept in the column usage information holding part 18 while being associated with the identification information for the memory element 12a, the column usage information holding part 18 updates the identification information for the memory element 12a in associating with the usage information for the analytical column 12 to that on a new memory element 12a.

DESCRIPTION OF REFERENCE SIGNS

1: Liquid chromatography system
2: Liquid feeding device

4: Autosampler
6: Column oven
8: Detector
10: System management device
12: Analytical column
12a: Memory element (usage information storage device)
14: Control part
16: Usage information managing part
18: Column usage information holding part
20: Usage information restoring part
22: Damage notifying part

The invention claimed is:

1. A chromatography system which includes an analysis channel in which an analytical column selected from two or more analytical columns is incorporated, and is configured so that a sample injected into the analysis channel is separated in the analytical column, the chromatography system comprising:
   a usage information storage device correspondingly provided for each of the two or more analytical columns, and configured to keep usage information for the corresponding analytical column;
   a column usage information holding part provided separately from each of the two or more analytical columns, and configured to keep the usage information for each of the two or more analytical columns, wherein the column usage information holding part is used for restoring the usage information in the usage information storage device for the corresponding analytical column;
   a usage information managing part configured such that after an analysis process of separating a sample injected into the analysis channel using the analytical column which is incorporated in the chromatography system is executed, the usage information managing part updates the usage information read from the corresponding usage information storage device to a latest state, writes the updated usage information into the corresponding usage information storage device, and writes the updated usage information into the column usage information holding part; and
   a usage information restoring part configured to cause the usage information storage device provided corresponding to the analytical column incorporated in the chromatography system to keep the latest usage information for the analytical column, using the usage information for the analytical column kept in the column usage information holding part,
   wherein the usage information storage device is replaceable with a new usage information storage device which keeps no usage information for the corresponding analytical column, and the usage information restoring part is configured to cause the new usage information storage device, which is provided corresponding to the analytical column incorporated in the chromatography system, to keep the latest usage information for the analytical column, using the usage information for the analytical column kept in the column usage information holding part.

2. The chromatography system according to claim 1, wherein the usage information managing part is configured to create, at the time when the analysis process of separating a sample injected into the analysis channel using the analytical column which is incorporated in the chromatography system is executed, the updated usage information using the usage information already kept by the usage information storage device and usage information resulting from a result of the analysis process, and to cause the corresponding usage information storage device and the column usage information holding part to keep the updated usage information.

3. The chromatography system according to claim 1, wherein the usage information restoring part is configured to cause the usage information storage device to keep usage information for the analytical column selected from among the analytical columns for which usage information is kept in the column usage information holding part based on a user operation.

4. The chromatography system according to claim 1, further comprising:
   a damage notifying part configured to execute a damage notification operation of notifying a user that usage information is unable to be read out if the usage information is unable to be read out from the usage information storage device provided corresponding to the analytical column incorporated in the chromatography system.

5. The chromatography system according to claim 1, wherein the column usage information holding part keeps the latest usage information for each of a plurality of the analytical columns, including the selected analytical column and at least one or more other analytical columns.

* * * * *